United States Patent
de Lind van Wijngaarden

(10) Patent No.: US 8,630,544 B2
(45) Date of Patent: *Jan. 14, 2014

(54) SYSTEM AND METHOD FOR CHANNEL-ADAPTIVE ERROR-RESILIENT BURST MODE TRANSMISSION

(75) Inventor: Adriaan J. de Lind van Wijngaarden, New Providence, NJ (US)

(73) Assignee: Alcatel Lucent, Paris (FR)

( * ) Notice: Subject to any disclaimer, the term of this patent is extended or adjusted under 35 U.S.C. 154(b) by 135 days.

This patent is subject to a terminal disclaimer.

(21) Appl. No.: 13/230,079

(22) Filed: Sep. 12, 2011

(65) Prior Publication Data
US 2012/0002961 A1  Jan. 5, 2012

Related U.S. Application Data

(63) Continuation of application No. 12/482,449, filed on Jun. 10, 2009, now Pat. No. 8,041,216.

(51) Int. Cl.
*H04J 14/00* (2006.01)

(52) U.S. Cl.
USPC .................................. 398/70; 398/71; 398/66

(58) Field of Classification Search
USPC ...................................................... 398/58–72
See application file for complete search history.

(56) References Cited

U.S. PATENT DOCUMENTS

| | | | | |
|---|---|---|---|---|
| 7,606,490 | B2 * | 10/2009 | Dalton et al. | 398/71 |
| 7,925,164 | B2 * | 4/2011 | Sitton et al. | 398/72 |
| 8,041,216 | B2 * | 10/2011 | de Lind van Wijngaarden | 398/71 |
| 2006/0133805 | A1 * | 6/2006 | Jang et al. | 398/26 |

* cited by examiner

*Primary Examiner* — M. R. Sedighian
(74) *Attorney, Agent, or Firm* — RGIP LLC

(57) ABSTRACT

In a passive optical network, an upstream transmission rate from an ONT to an OLT can be optimized by matching a transmission scheme for a channel to the upstream transmission characteristics of the channel. An FEC coding can be made channel dependent so that channels with low error rates can use minimal protection, and therefore minimal overhead, while channels with high input bit error rates can use the level of FEC coding required to produce a desired output bit error rate.

20 Claims, 4 Drawing Sheets

SYSTEM AND METHOD FOR CHANNEL-ADAPTIVE ERROR-RESILIENT BURST MODE TRANSMISSION

CROSS REFERENCE TO RELATED APPLICATIONS

This application is a continuation application of U.S. application Ser. No. 12/482,449, filed Jun. 10, 2009, entitled "SYSTEM AND METHOD FOR CHANNEL-ADAPTIVE ERROR-RESILIENT BURST MODE TRANSMISSION".

FIELD OF THE INVENTION

This disclosure relates to passive optical networks and in particular to error resilient methods for providing upstream transmissions.

BACKGROUND OF THE INVENTION

Many access networks, in particular passive optical networks (PONs), provide a range of broadband and narrowband services using two-way communications between an access node (AN) and network terminals (NTs). PON is a widely used network architecture for residential and business broadband access. PONs are considered to be inexpensive for network operators because they do not require any active equipment or power supplies between the operator's central office (CO) and customer's premises (CP). In a typical PON an optical line termination (OLT) device provides downstream communications to multiple NTs, termed optical network units (ONU)s or optical network termination (ONT) devices.

In the ITU-T and IEEE standards, such as ITU-T recommendation G.984.3, "Gigabit-capable Passive Optical Networks (GPON): Transmission convergence layer specification, March 2008 and IEEE P802.3av-D3.3, "Physical layer specifications and management parameters for 10 Gb/s passive optical networks", IEEE 802.3 amendment, May 12, 2009, both of which are incorporated herein in their entirety by reference, the upstream is either not protected or a forward error correction (FEC) code may be used. Forward error correction (FEC) is often used in communication systems, and is based on transmitting the data in an encoded format. The encoding introduces redundancy, which allows the decoder to detect and correct transmission errors.

Typically, a systematic code such as a Reed Solomon (RS) code is used. A systematic code is a code where the part that carries the information is not transformed. The check symbols are computed and appended. If one does not use a decoder, it is sufficient to drop the check symbols. No other operation is required to be performed to retrieve the data (this is unlike, for instance, many convolutional codes), which is seen as one of the advantages of using systematic codes. Another advantage is the burst error correcting capability. Since the code corrects "symbols" of m bits each, if multiple consecutive bits are highly likely to be in error (a burst error), then it "counts" as only a few symbol errors.

The main motivation for using the FEC is the ability to operate at a lower signal to noise ratio (SNR) and its associated (higher) input bit error rate (BERi) while maintaining a low output bit error rate (BERo). For example, the (255,239) RS code described above provides a BERo below $10^{-15}$ for a BERi up to $10^{-4}$. This translates to an increase of the link budget of approximately 3-4 dB, and a reduction in data rate of approximately 7% when compared to no FEC. It should be noted that the FEC can be disabled, in which case the frames are sent without FEC protection.

The links between the OLT and the different ONUs typically have different SNRs and corresponding different BERis. If the link between the OLT and an ONU is good such that the BERi is already low, strong FEC is undesirable, because such FEC would require redundancy levels that reduce the transmission rate. At the same time, for a link between the OLT and an ONU that has a low SNR and a correspondingly high BERi, the standard level of FEC may not be sufficient to provide an acceptable BERo. As such, for a system with an OLT and multiple ONUs, the performance in terms of upstream transmission rate for a specified maximum BERo is determined by the link conditions and the strength of the FEC.

Thus, what is required is a system and method for providing improved transmissions from an ONU to an OLT in a PON network.

SUMMARY OF THE INVENTION

In one aspect of the disclosure, there is provided a method for performing communications in a passive optical network comprising at least one optical line termination device and a plurality of optical network units downstream of the at least one optical line termination device. The method comprises determining upstream transmission characteristics for channels between the at least one optical line termination device and the plurality of optical network units, configuring a plurality of transmission schemes for a plurality of the optical network units, each transmission scheme being dependent on the upstream transmission characteristics of a channel between the respective optical network unit and the at least one optical line termination device, and performing upstream transmissions from the plurality of optical network units to the at least one optical line termination device in accordance with the transmission scheme of the respective optical network unit.

In one aspect of the disclosure, there is provided an optical network unit for a passive optical network. The optical network unit is configured to apply a forward error correction code scheme to one or more frames, transmit the one or more frames to an optical line termination device, receive a control message from the optical line termination device indicating an alternative forward error correction code scheme, and apply the alternative forward error correction code scheme to one or more frames subsequently transmitted from the optical network unit.

In one aspect of the disclosure, there is provided an optical line termination device for a passive optical network. The optical network unit is configured to determine the signal power at the optical line termination device of a plurality of optical network units, and schedule transmissions from the plurality of optical network units such that the signal power of consecutively transmitting optical network units vary by less than a predetermined amount.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
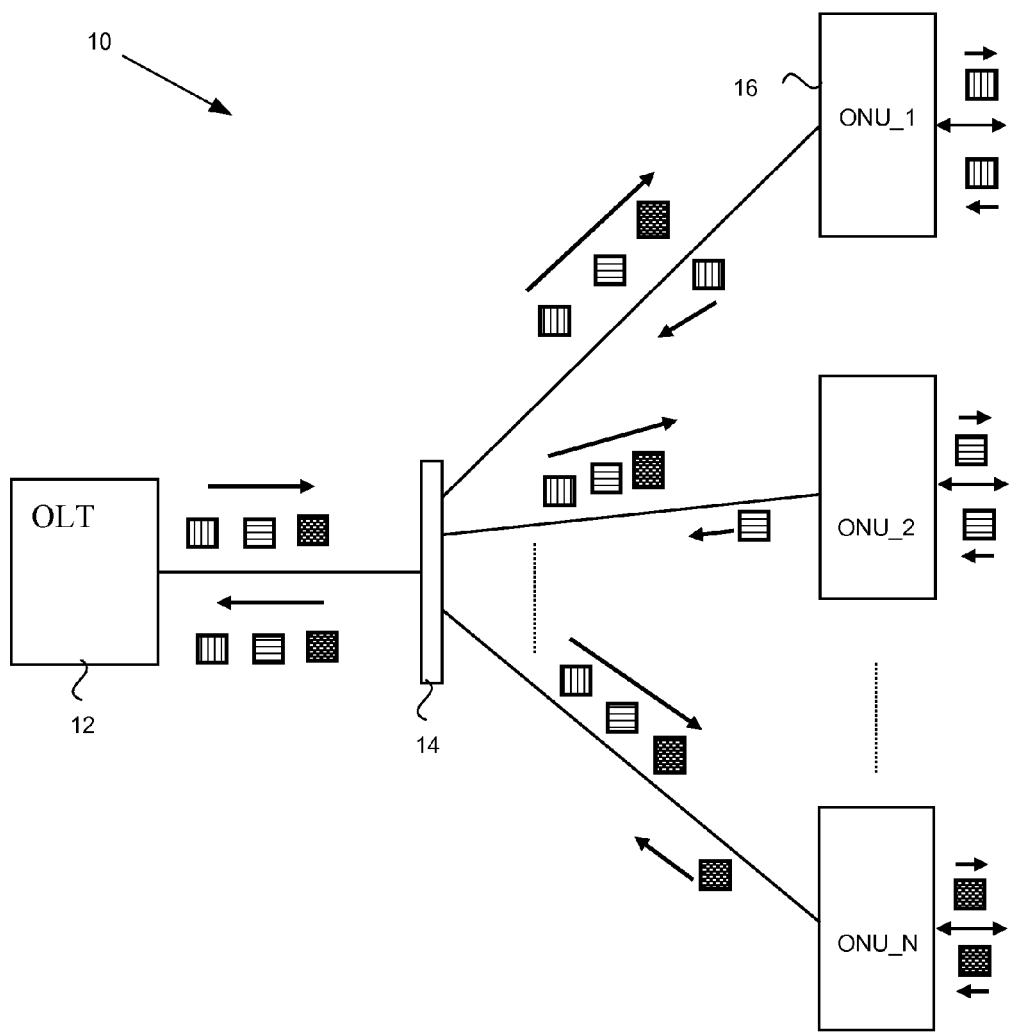
FIG. 1 illustrates a passive optical network.

In FIG. 1, there is shown a passive optical network 10 in which an optical line termination (OLT) device 12 communicates through an optical distribution network (ODN) with a plurality of optical network units (ONUs) 16 via an optical splitter 14.

Figure 2:
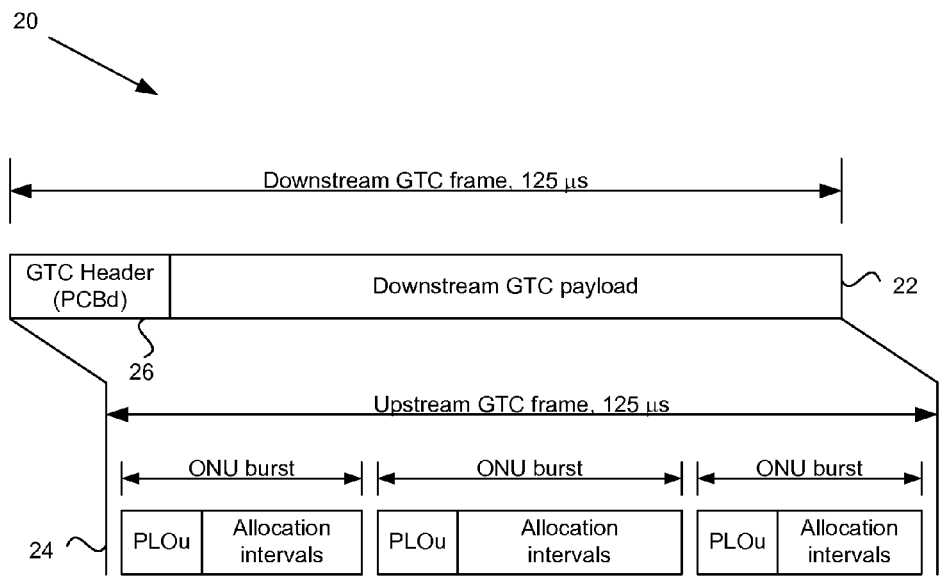
FIG. 2 illustrates upstream frames.

In the upstream direction (from the ONUs to the OLT), the ONUs 16 send packets in burst mode, typically in the timeslots allocated by the OLT 12. Typical uplink speeds are 1 Gb/s, 2.5 Gb/s and 10 Gb/s (currently under development). Both the downstream and upstream contain control information for the individual ONUs. This is illustrated in FIG. 2 by a G-PON reference diagram 20 of a stream of downstream 22 and upstream 24 G-PON transmission convergence (GTC) frames, as well as in FIG. 3. Here, the OLT broadcasts the GTC frames to every ONU. The Physical Control Block downstream (PCBd) 26 is received by every ONU, and the ONUs then act upon the relevant information contained in the PCBd 26, in particular the bandwidth map that specifies the burst allocation for upstream communication to the OLT for each ONU. The fields depicted in FIG. 3, as well as other similar figures, serve only as an example and inherent error control segments and fields with repeated data may be modified, shortened and/or removed in future PON systems. The fields thus created can then be used for FEC, e.g., by one of the proposed (shortened, stronger) FEC codes. Other RS codes, such as a (255,223) RS code have been proposed for optical networks under consideration.

Figure 4:
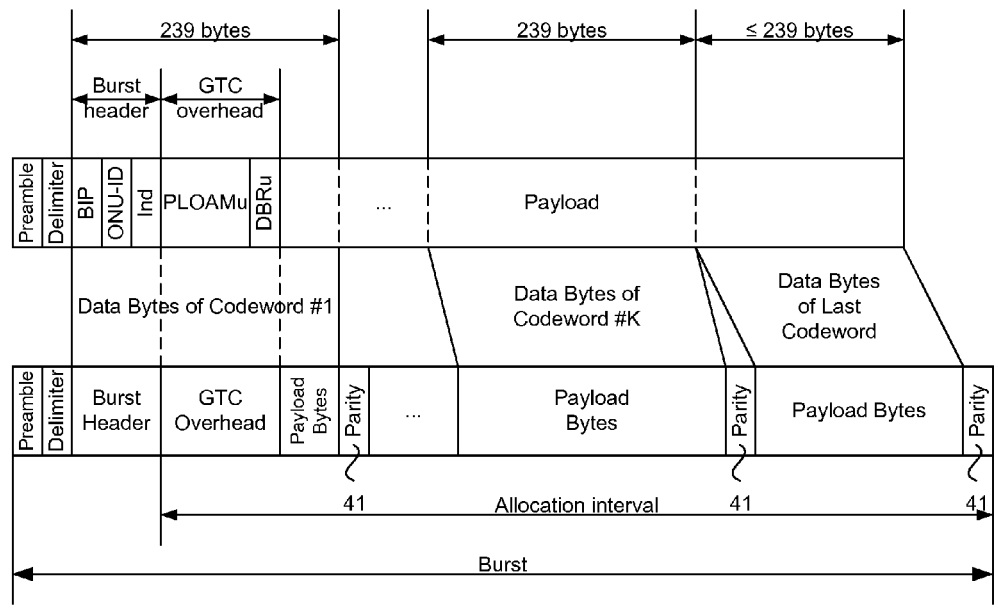
FIG. 4 illustrates frames with forward error correction coding.

An example of FEC may be based on a Reed Solomon (RS) code consisting of n symbols (of m bits each), out of which k symbols are information-carrying symbols; the remaining (n−k) symbols are parity symbols. Such a code, commonly referred to as an (n,k) RS code, can correct up to (n−k)/2 (random) symbol errors. The maximum length for a given symbol size m (bits) is $2^m-1$. In particular, the (255,239) RS code that is capable of correcting up to 8 symbols (bytes) is currently utilized to protect the upstream against transmission errors. If this code is used, the upstream burst transmission of the frames is interspersed with inserted FEC parity bytes 41 as shown in FIG. 4. Other RS codes, such as a (255,223) RS code, have been proposed for optical networks under consideration.

Other FEC codes, e.g., Bose Chaudhuri Hocquenghem (BCH) codes, can be used, which are bit-oriented, systematic, algebraic codes (whereby an erasure aspect described below does not work, but truncation of the payload does), and low-density parity check codes (where the rate can be changed by puncturing (not sending) preselected groups of parity bits. Other options are product codes (e.g., RS×RS or RS×BCH or BCH×BCH).

Figure 5:
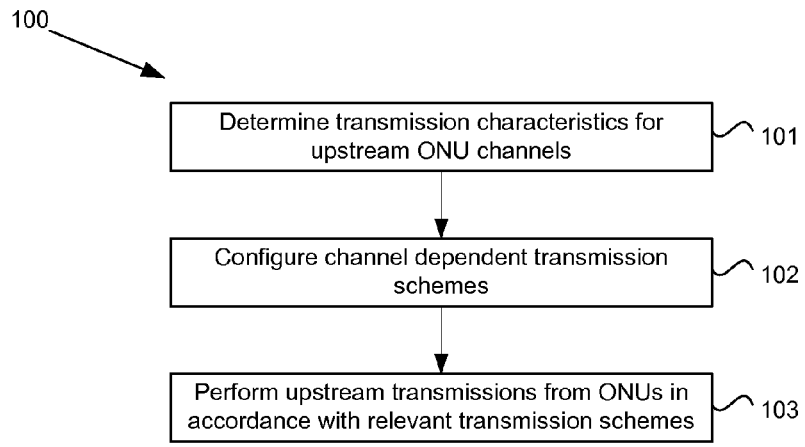
FIG. 5 illustrates a method for performing upstream communications.

As described above, there can be issues with providing adequate protection and error correction of upstream transmissions due to variations in the SNR of the various OLT-ONU channels. A method for performing upstream transmissions that can at least reduce these issues is illustrated in the flowchart 100 of FIG. 5. At step 101, the transmission characteristics of the upstream transmission channels from the ONUs 56 to the OLT 54 are determined. Using the upstream transmission characteristics, channel dependent transmission schemes can be configured for the channels from each of the ONUs (step 102). Upstream transmissions from the ONUs to the OLT can then be performed using the channel dependent transmission schemes for the respective ONUs (step 103). In another embodiment, a "monitor input BER and related statistic" block can be provided in FIG. 4 and, if threshold(s) are exceeded, FEC parameters can be adjusted. As such, the quality is monitored and actions are taken if the channel changes. Further, sync errors can be traced in order to adjust delimiter length, etc. Though channel characteristics do not very much over time, the BER can be monitored, either periodically or continuously, and updates made to the FEC scheme if necessary to either increase the strength of the FEC, thereby reducing the error rate, or decreasing the FEC thereby allowing a higher transmission rate.

In one embodiment, a transmission scheme may incorporate an appropriate level of FEC for each one of the OLT-ONU upstream links. By this method, FEC overheads are effectively used only for those channels that need FEC.

For ONUs that have a very bad channel, a channel-dependent transmission scheme may include a transmission scheme with appropriately strong FEC and sync mechanisms to reach the OLT. In addition, transmission schemes may use (hybrid) ARQ with Chase-like decoding as will be described in greater detail below.

Thus, a method in accordance with an embodiment of the disclosure determines the characteristics of the channels from each ONU to the OLT, allowing a scheme, format and/or FEC code to be configured such that the OLT can detect the burst, synchronize, extract the relevant header information and reconstruct the data can up to the required BERo. This may include modifications to the preamble, the delimiter and the (FEC) protection (correction as well as error detection) of the burst header.

Figure 6:
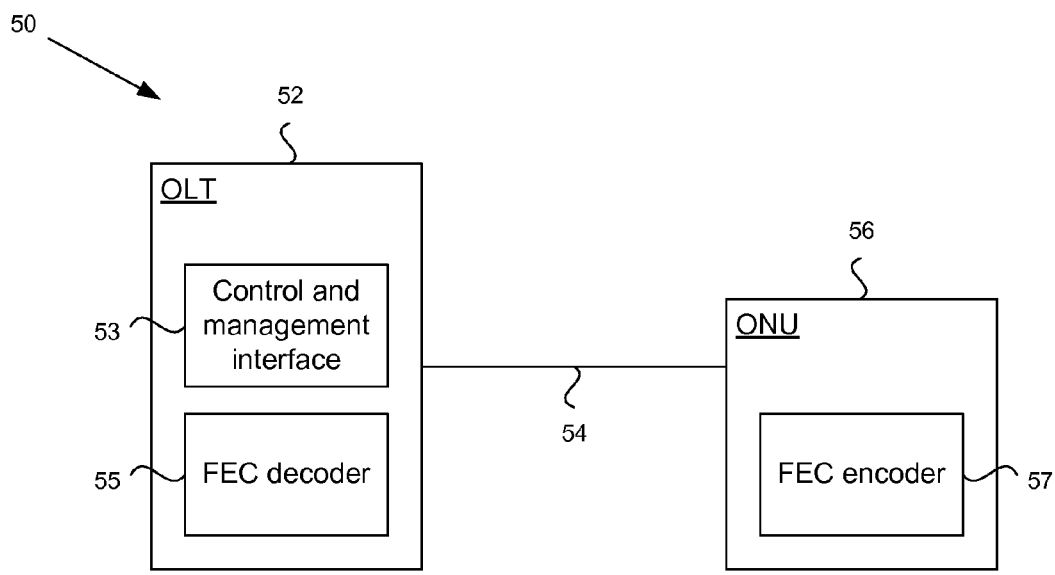
FIG. 6 illustrates a modified OLT-ONT link.

The method may be embodied in a passive optical network 50 shown in FIG. 6. The PON 50 may include an OLT 52 and a plurality of ONUs 56, though only one ONU 56 is shown. The OLT 52 communicates with the ONUs 56 through suitable optical channels 54. As shown in FIG. 6, the OLT may include a control and management interface 53 that is configured to determine upstream transmission characteristics of the channels 54. For example, the control and management interface 53 may be configured to determine one or more of the signal power level per channel, the SNR, BERi or any other suitable upstream transmission parameter. The ONUs 56 may each be configured with a FEC encoder 57 for providing forward error correction code into upstream transmission frames. Correspondingly, the OLT may be configured with an FEC decoder 55. The FEC encoder 57 may be configurable from the OLT, e.g. from the control and management interface 53. Components of the OLT 52 and ONU 56 that are not critical for highlighting the features of the present disclosure, such as the clock data recovery (CDR) block, a frame sync/delimiter detection block, etc have been omitted for clarity. Further details of such components are available in the standards referenced above.

One option for determining the upstream channel transmission characteristics is to measure the SNR when the system is installed. In an alternative embodiment, the system may be started with a high level of FEC (and subsequent lower rate) which allows the FEC decoder in the OLT to count the number of errors that occurred in the frames. If the FEC code is strong, it ensures that all errors are corrected, and thus it is easy to count them. If for example for one OLT-ONU link 15 errors are counted after 1E6 bits, the BERi is likely to be around 1.5E-5. Because of the high transmission rates, the necessary statistics are likely to be obtained in a short time frame.

In one embodiment, a measure of the upstream transmission characteristics includes the variance of consecutive measurements. If this is in line with expectations, then the effective BERi can be considered to be known, as well as possibly some other statistics, and an appropriate FEC can be chosen accordingly. The other statistics may include the number of corrected frames, the number of uncorrectable frames, as well as the number of errors in some other fields. These numbers should match a predefined model to a large extent. For example, consecutive errors (burst errors) are not typically expected, but if they do occur, they will lead typically lead to a higher frame error rate than would typically be expected. A Reed Solomon code is fairly resilient, but even in such cases, a slightly stronger code can be used.

Once the upstream characteristics are known, the OLT can select appropriate FEC parameters for future transmissions on a channel and communicate the chosen FEC parameters the ONT on that channel, for example in PLOAM-like commands, or a similar control message. Protocols for requesting and/or reporting the upstream transmission characteristics are considered to be within the skill of a person skilled in the art and thus no further discussion of the reporting mechanisms are considered to be necessary here.

The characteristics of each ONU-OLT upstream link do not vary much over time, and therefore the control or management interface 53 can be used within the OLT 56 to select the appropriate scheme and FEC code parameters for each link, and use these parameters for subsequent upstream burst transmission slots. For example, the PLOAM field may be used to convey control information. It is only a few bits, so control information and operations, administration and management (OAM) information is typically conveyed at a much lower speed. This is used to retrieve a parameter from the ONU, or to set a parameter.

In one embodiment, there is provided a channel-adaptive upstream FEC scheme that ensures correct symbol synchronization and frame synchronization for the "worst" ONU-OLT upstream link conditions. For each of the ONU-OLT upstream links, the appropriate level of FEC is used. By using this method, effective FEC is provided that suffers the overhead only for those channels that need it (and, optionally, some trivial, very high rate FEC for error correction/detection for the channels that are good).

In this embodiment, an FEC code that has a configurable rate (and, consequently, configurable error correction capabilities) is used. In the following, let p denote the value of BERi for which a required BERo can be achieved. For the given BERi, one can determine a code that provides the required BERo. For instance, for a standard (n,k) RS code (with its corresponding encoder in the ONU and decoder in the OLT), the FEC capabilities can be increased by reducing the length of the information-carrying part, i.e., an $(n_1,k_1)$ code where $n_1-k_1=n-k$. The rate of an (n,k) RS code can also be increased by puncturing some symbols at known positions, e.g., the last b parity bytes. The punctured bytes are regarded as erasures. The punctured code can thus correct up to (n−k−b)/2 symbol errors.

As an example, consider the use of an (n,k) RS code, and in particular an (255,223) RS code, as a base code and a BERo that is at most $10^{-12}$. The rate of this code is 0.8745 and $p \approx 8.3 \times 10^{-4}$. If the payload is shortened, e.g., to 100 bytes, with, as before, n−k=32 check bytes, the resulting effective code rate is equal to 0.7576. However, the error correcting capabilities are now better than required ($p \approx 1.6 \times 10^{-3}$). The other way around, by puncturing the last 8 bytes of a (255, 223) code, the rate can be increased at the expense of error correction capabilities.

In one embodiment, an FEC encoder and decoder can be made to be configurable and thus used to generate and decode a wide variety of derived FEC codes, such as a (255,239) code and a (255,223) code, the parameters of which are matched to the channel conditions, and as such, the overhead is minimized. In one embodiment, it may be necessary to maintain the same field size for the FEC scheme.

Slight adaptations to the RS encoder and RS decoder may allow it to encode and decode any (n,k) RS code, where n−k<=P, for a given value of P, and n<=2^m−1, (or possibly one-two symbols larger). For instance, for the (255,223) code, P=32 (max. 16 correctable errors). The encoder/decoder can, after slight modifications, also be used to handle (255,225), ... (255,239), ... (255,253), (255,254), i.e., with rates from approx ⅞ (approx. 15% overhead) to 254/255 (approx. 0.25% overhead). Payload truncation could give a code, e.g., (8,4) RS code (rate=½), or even (33,32) RS (rate ¹⁄₃₃). Some of the "extreme parameter settings" such as very high rates are mostly of interest for error detection and the low and extremely low rates are of interest for very really bad channels—the extremes, like the rate ¹⁄₃₃ code is not that interesting, but codes with rates of ½ or ¼ may be quite effective for the protection of the header or other important info, e.g., (64,32) RS code (rate ½, 16 symbol errors can be corrected). If this is used for upstream in the beginning of the (burst) frame where the BERi is high, e.g., starting off at 1E-2, and if the BERi in the second part of the frame becomes very low, e.g., 1E-8, one can use one rate ½ code (e.g. (64,32) RS code, followed by (255,245) RS (5-error correcting). That way, the overall amount of overhead can be lower than if a uniform (255,223) RS code was used, and the "effective" protection is obviously much better. One could also think of several stages where the rates of the RS codes increase gradually. In terms of measurement, an additional parameter for such a scheme would be to determine how many errors there are in the (correctly) decoded first, second, third RS codeword. That way, one can trace the decreasing BERi. For the RS codes to be flexible, they should preferably have the same Galois field (e.g., $GF(2^8)$, corresponding to 8-bit symbols (bytes)). This is also why there is a maximum wordlength (typically $2^8-1$ (extension by 1-2 bytes may be possible, so called extended RS codes). The number of bits per symbol (m), is not necessarily 8, of course, but for hardware to be shared, it is best to have the same m.

In an alternative or additional embodiment, the OLT 52 can determine sets of ONUs 56 that have a similar channel signal power, and to group the burst transmissions from these ONUs, such that there are fewer high-power/low-power detection problems at the beginning of the burst.

The bit error rate at the beginning of a burst transmission is typically higher than later in the burst. One of the causes is transmission of a high-powered burst from one ONU followed by a low-powered burst from another ONU, or vice versa. In this situation, the threshold detectors and other parts of the detector have to readjust to the new power levels. Since the OLT should be aware of the power levels detected for each ONU, the OLT can configure a transmission scheme that schedules the bursts in such a way that the power difference between consecutive bursts is reduced, e.g., sorting from low to high, or vice versa, or allowing up to a certain power difference for two consecutive bursts, e.g., 3-5 dB.

The beginning of a burst typically has a higher bit error rate than the middle and the tail of the burst. As such, in one embodiment, it may be beneficial to use a transmission scheme having a stronger FEC code in the beginning of the burst, e.g., by shortening the systematic part, and/or by interleaving, in order to spread the impact of the higher BER across different codewords. This shortening and interleaving can also be used to create a sequence of frames where the last frame is a full length frame, rather than a shortened frame which is currently often the case. A bit error rate can be determined at the beginning of the burst (frame) by counting errors in the delimiter, etc. Since the delimiter and preamble and part of the header are known, one could also use the 0→1 and 1→0 statistics to adjust the threshold of the detector.

Especially for the upstream, the FEC codewords can be used to determine the BERi as a function of the position of the bit in the burst by keeping track of the number of "corrected" errors in each of the codewords. These codewords may have different lengths, for example, where one (64,32) RS codeword (64 bytes) is followed by (255,245) RS codewords. One could also have, for instance, a codeword of length 64, then 128, then 192, then 255. If a packet ends before the end of the codeword, the codeword is truncated, and the overhead can be adjusted.

In one embodiment, the transmission scheme may include an FEC scheme embedded in the underlying (GEM) frames and, depending on the required quality of service (QoS), sent across GTC frames to reduce losses due to fractioning of variable length frames. Depending on the channel quality, the information currently in the PCBd block that is relevant for a particular ONU is protected and/or partially replicated at predetermined positions in the GEM frames.

One option, for both upstream and downstream, is to start with the same and relative strong FEC parameters, and to adjust these for the individual OLT-ONU links (upstream, downstream) over time. A control channel or OAM channel can be used to convey the new parameters. The update process could be aided by using the frame counter. The control/OAM message specifies at which frame counter the new FEC setting becomes active, and it may choose this far enough in the future that one can assure that an acknowledgement is received well before the transition to the new parameters (until then, the old FEC setting is used). As an option, the updates of the parameters can be broadcast to all ONUs, such that they know from each other what the parameters are. If an ONU was inactive, it starts in the strong FEC mode and adjusts after measurements of the error rates have been made. Optionally, previously used values can be stored also (after all, the channel conditions typically do not change). If, for whatever reason, the channel conditions become worse, the FEC settings can be changed to obtain a stronger FEC. In one scenario, where there are heavy disturbances for all channels, they may all decide to go back to strong FEC. In any case, the FECs can effectively measure the BER and protect the channels adaptively. Other parameters, e.g., preamble length for upstream, delimiter length, delimiter sequence specification, header protection scheme, can be communicated in a similar fashion as for the FEC parameters.

For ONUs that have an exceptionally bad reception, the transmission scheme can embed a "burst-like frame" in the upstream that has additional fields for synchronization, control and FEC, such that the detection and correction capabilities are in line with the channel conditions. For such (bad) channels, schemes that retain received but uncorrectable blocks such as (hybrid) ARQ-like techniques can be used to decode information after the reception of subsequent frames. For example, if the SNR is very low, the packet error rate for a given OLT-ONU may become very low. The standard procedure is to discard the packet and request a retransmission. However, if the OLT can store the (erroneous) packet, it can either request the packet to be sent again or it can ask for more parity checks (that were computed but not sent). In the first case, the decoder combines the (erroneous) packets to see where they differ, and use for instance Chase decoding, which is a known method for combining erroneous packets and correcting them. In the case of transmission of extra parity check symbols, which is shorter than resending the packets, the decoder reassembles the (now longer) FEC code with more overhead and tries to decode this (stronger) code.

Figure 3:
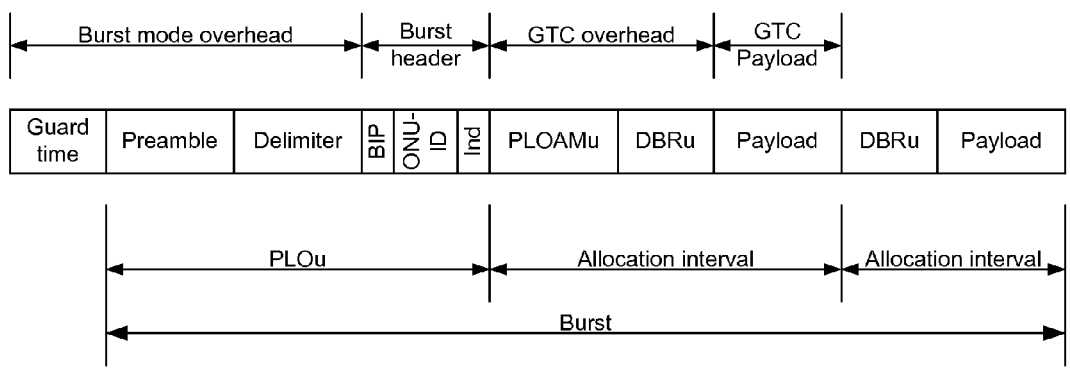
FIG. 3 illustrates a physical and GTC layer upstream overhead.

In ONUs that have an exceptionally bad reception, the BER at the beginning of the burst may be such that the synchronization acquisition probability is lowered and the FEC codes, even shortened, are likely to fail. In such cases, a transmission scheme may include idle packets with the "idle" packets being designed in such a way that they are optimized for burst detection and synchronization (alignment). This could also be the case if the current framework as shown in FIGS. 3 and 4 is not sufficient to detect the presence of the frame and acquire synchronization. In such cases a much more error-resilient packet structure may be embedded in the payload. The OLT would then have to scan for such payloads. For example, in G.984.3 referenced above, the idle GEM frame is defined as a 5-byte packet with the contents: 0xB6AB31E055 (see Section 8.3.2, page 49). Currently, just the 5 bytes are used, or the first X bytes (0<X<5) to stuff the frame towards the end of the GTC frame boundary.

The preamble and parts of the header information are fixed and known to the OLT. As such, in one embodiment, the preamble and header can be taken into account in the design of the delimiter, thereby forming a distributed delimiter, where the OLT searches for a non-contiguous sequence of known symbols.

In one embodiment, a transmission scheme may include the addition of extra error detection and correction to the GEM frame headers, and in addition a reduced size delimiter to detect bit slips.

Advantages of the above described embodiments include the ability to perform error-resilient burst transmission from an ONU to the OLT that is guaranteed a certain BERo while maximizing the detection and correct header processing, maximizing the data rate and minimizing the overhead in systems where the SNR of the links between the ONUs and the OLT differs significantly. The above described embodiments make it possible to effectively protect data and control information in the upstream channels using a minimum amount of extra overhead for given channel conditions for a given ONU-OLT link. The advantages can be significant (e.g., close to a 15% rate increase for deployments where a (255,223) RS code is used and the active ONU-OLT links are good), as well as the ability to deploy the system when several ONUs have very bad channel conditions (e.g., are far away, have a low quality transmitter or suffer other losses). Extra overhead in terms of FEC and sync will only be used selectively when communicating from these ONUs to the OLT; the frames/segments for the other ONUs will be protected according to their channel condition (for good channels, there will be hardly any additional overhead).

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   determining upstream transmission characteristics at least one channel between at least one optical line termination device and at least one optical network unit;
   configuring a transmission scheme at the at least one optical network unit by configuring a channel dependent forward error correction scheme that is dependent on upstream transmission characteristics of the at least one channel;
   communicating an alternative forward error correction scheme to the at least one optical network unit on the at least one channel; and
   applying the alternative forward error correction code scheme to one or more frames subsequently transmitted from the optical network unit.

2. The method according to claim 1 comprising performing upstream transmissions from the at least one optical network unit to the at least one optical line termination device in accordance with the transmission scheme.

3. The method according to claim 1 wherein determining upstream transmission characteristics comprises determining an input bit error rate for the channel and wherein configuring a forward error correction scheme for a channel comprises:
   determining a required output bit error rate; and
   determining a forward error correction scheme that is configured to produce the required output bit error rate from the input bit error rate.

4. The method according to claim 3 wherein configuring a forward error correction scheme comprises providing stronger error correction at a beginning of a burst transmission from the optical network unit than at an end of the burst transmission.

5. The method according to claim 4 comprising maintaining a last frame of the burst transmission as a full length frame.

6. The method according to claim 1 wherein determining upstream transmission characteristics comprises determining a signal to noise ratio of the channel at the at least one optical line termination device.

7. The method according to claim 1 wherein determining upstream transmission characteristics comprises determining a signal power level at the at least one optical line termination device for burst transmissions from a plurality of the optical network units.

8. The method according to claim 7 wherein configuring a transmission scheme comprises ordering burst transmissions from the at least one of the optical network units such that power levels from consecutively transmitting optical network units vary by less than a predetermined amount.

9. The method according to claim 1 wherein configuring a transmission scheme comprises instructing the at least one optical network unit to embed a forward error correction scheme into an underlying GEM frame.

10. The method according to claim 1 wherein configuring a transmission scheme comprises instructing the at least one optical network unit to transmit one or more idle packets in a burst transmission, wherein the one or more idle packets are configured to provide at least one of burst detection and alignment.

11. The method according to claim 10 comprising detecting the one or more idle packets in the at least one optical line termination device.

12. The method according to claim 1 wherein configuring a transmission scheme comprises instructing the at least one optical network unit to transmit a burst transmission comprising at least one distributed delimiter.

13. The method according to claim 1 comprising determining a plurality of transmission schemes in the at least one optical line termination device for the at least one optical network unit and communicating the plurality of transmission schemes from the at least one optical line termination device to the at least one optical network unit.

14. The method according to claim 1 wherein determining upstream transmission characteristics comprises receiving one or more frames in the at least one optical line termination device from the at least one optical network unit.

15. The method according to claim 14 wherein determining upstream transmission characteristics comprises:
   applying the forward error correction code scheme to the one or more frames; and
   counting the number of errors corrected by the forward error correction code scheme.

16. The method according to claim 15 comprising selecting the alternative forward error correction scheme depending on the number of errors counted.

17. An optical network unit configured to:
   apply a forward error correction code scheme to one or more frames;
   receive a control message from an optical line termination device indicating an alternative forward error correction code scheme based on the applied forward error correction code scheme; and
   apply the alternative forward error correction code scheme to one or more future frames.

18. The optical network unit according to claim 17 configured to provide stronger error correction at a beginning of a burst transmission than at an end of the burst transmission.

19. An optical line termination device configured to schedule transmissions from at least one optical network unit, based on a determined signal power, such that the signal power of consecutively transmitting optical network units vary by less than a predetermined amount, the optical line termination device further configured to select an alternative forward error correction code scheme and communicate the alternative forward error correction code scheme to the optical network unit.

20. The optical line termination device according to claim 19 configured to:
   receive one or more frames from an optical network unit;
   apply a forward error correction code scheme to the one or more frames; and
   count the number of errors corrected by the forward error correction code scheme.

* * * * *